Figure 1:
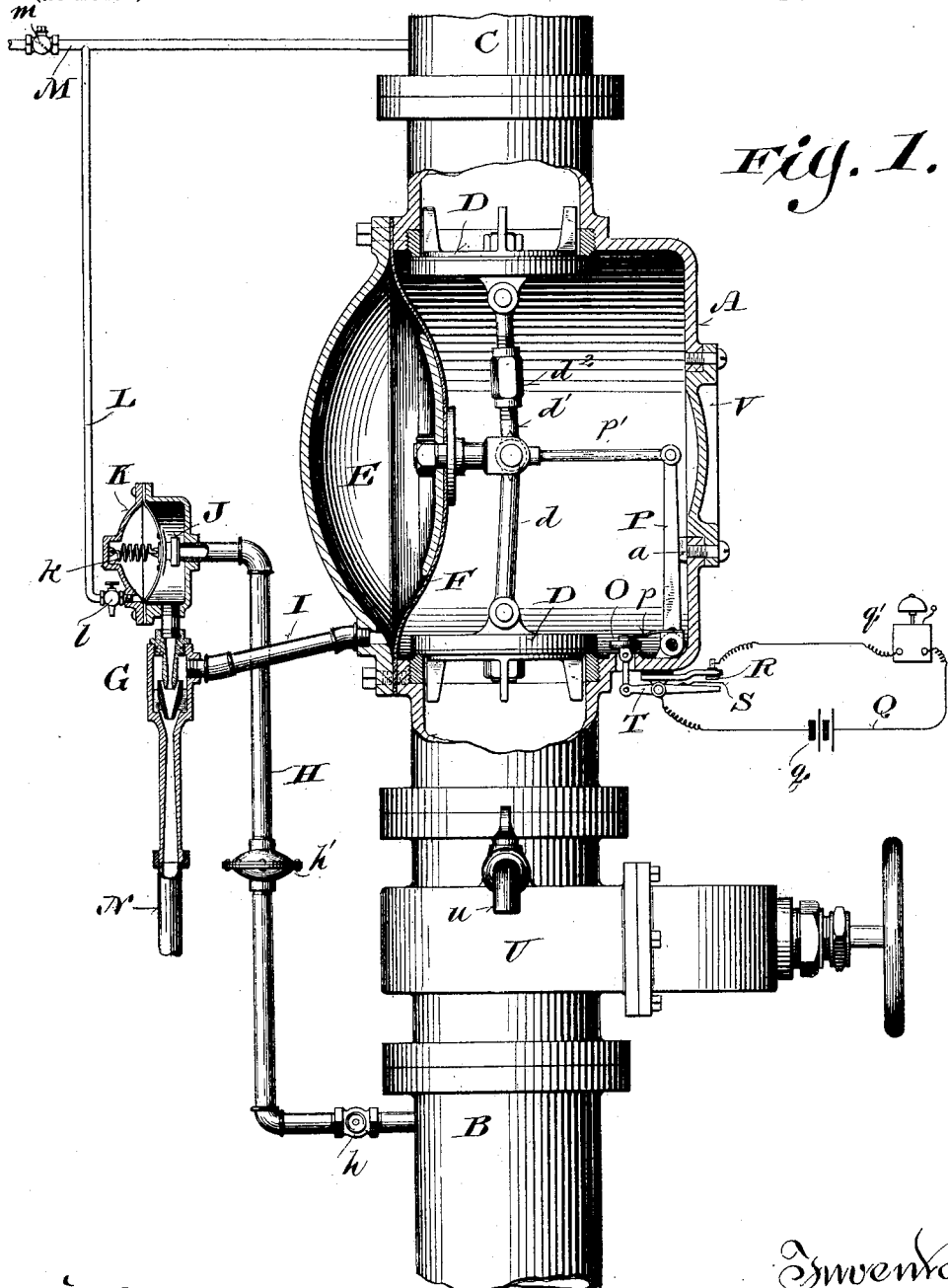

No. 687,149. Patented Nov. 19, 1901.
C. L. FORTIER.
VALVE FOR AUTOMATIC FIRE EXTINGUISHING SYSTEMS.
(Application filed Mar. 19, 1900.)
(No Model.) 2 Sheets—Sheet 1.

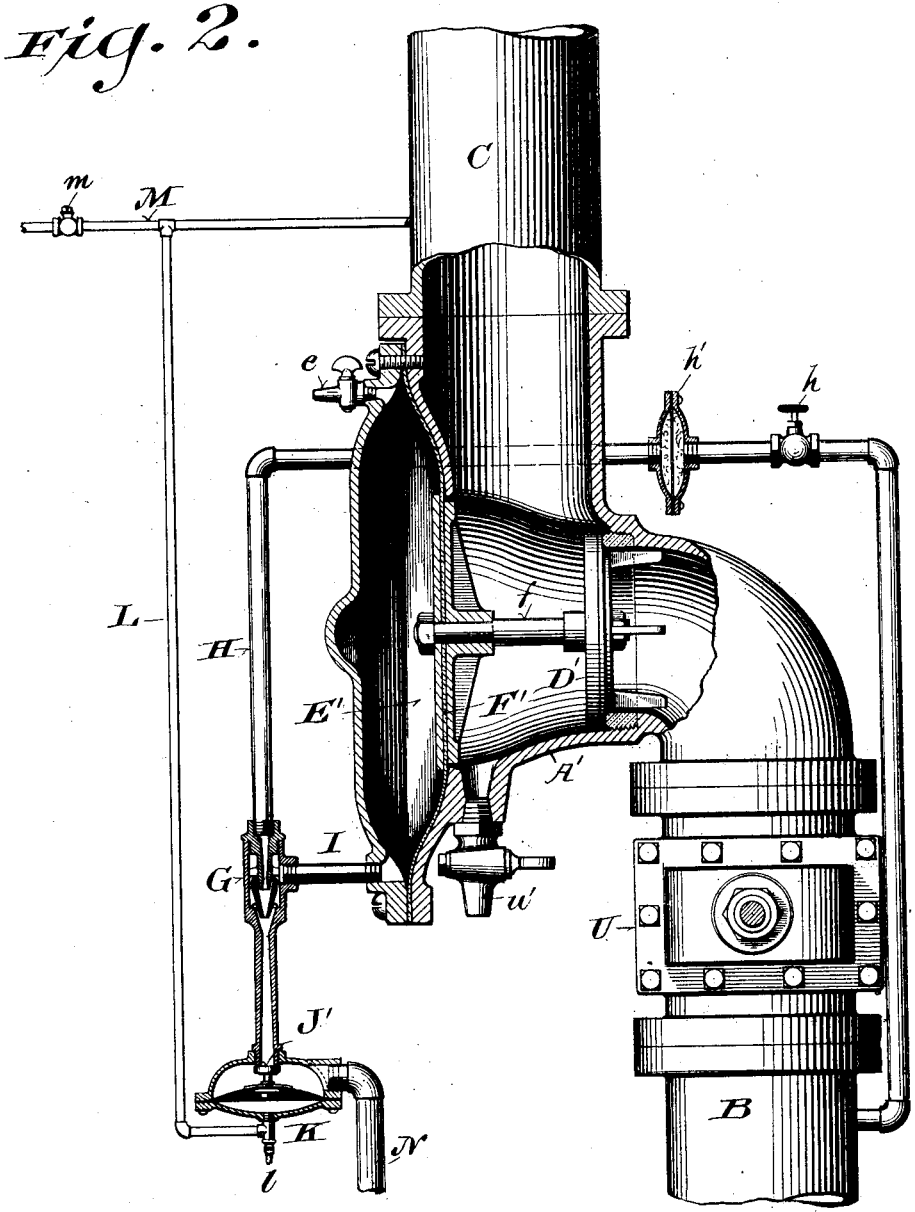

UNITED STATES PATENT OFFICE.

CHARLES L. FORTIER, OF MILWAUKEE, WISCONSIN, ASSIGNOR TO GEORGE KNOWLES, OF MILWAUKEE, WISCONSIN.

VALVE FOR AUTOMATIC FIRE-EXTINGUISHING SYSTEMS.

SPECIFICATION forming part of Letters Patent No. 687,149, dated November 19, 1901.

Application filed March 19, 1900. Serial No. 9,205. (No model.)

*To all whom it may concern:*

Be it known that I, CHARLES L. FORTIER, a citizen of the United States, residing at Milwaukee, in the county of Milwaukee and State of Wisconsin, have invented certain new and useful Improvements in Valves for Automatic Fire-Extinguishing Systems, of which the following is a specification, reference being had to the accompanying drawings, forming a part thereof.

My invention relates to automatic valves designed primarily to control the admission of water to the distributing pipe or pipes of a fire-extinguishing system. Its main object is to simplify and improve the construction and operation of devices of this class; and it consists in certain novel features of construction and combinations of parts, as hereinafter particularly described, and pointed out in the claims.

In the accompanying drawings like letters designate the same or similar parts in both figures.

Figure 1 is a view, partly in elevation and partly in vertical section, of an automatic valve and its connections embodying my invention; and Fig. 2 is a similar view of a modification of the device.

Referring to Fig. 1, A is the main-valve case, having supply and service connections and ports. B and C are the supply and service pipes. D D are the main valves controlling the supply and service ports. They are connected by a toggle-lever $d\ d'$, one member $d'$ of which consists of two reversely-threaded parts connected by a right and left threaded adjusting sleeve or nut $d^2$. Although one valve would with suitable connections be sufficient to control communication between the supply and service ports, each of the two valves D D serves, in connection with the toggle-lever, as a support for holding the other closed. E is an expansion-chamber formed in one side of the valve-case by a flexible diaphragm F and a cover or plate bolted therewith to the valve-case. The diaphragm is connected by a stem with the pivot between the members of the toggle-lever $d\ d'$, which is carried to the right or away from the diaphragm past a straight line connecting the ends of said lever for closing the valves, which are thus held closed without pressure in said chamber. G is an aspirator which is connected at its inlet end by a pipe H with the supply-pipe B or with any other convenient source of fluid-pressure. This pipe is provided with a valve $h$ for manually shutting off the fluid-pressure supply from the aspirator. It is also provided with a filter $h'$, by which any impurities contained in the water or other fluid are prevented from passing into and clogging or affecting the aspirator. I is a pipe connecting the aspirator on one side between its inlet and outlet with the lower part of the expansion-chamber E. J is a valve which normally closes the pipe H and shuts off the water or other fluid under pressure from the aspirator. K is a fluid-pressure motor the diaphragm or movable part of which is attached to or connected with said valve. It is provided with a spring $k$, which tends to open the valve, and its expansion-chamber is connected by a pipe L with the service-pipe C. This pipe enters the lower part of said chamber and is provided with a cock $l$ for draining it. M is an air-supply pipe, provided with a check-valve $m$ for charging the service-pipe C and its connections with compressed air. The check-valve $m$ closes away from the pipe C, and thus prevents water when it rises in the service-pipe C flowing therefrom back through the pipe M to the source of compressed air, but allows it to pass freely through the pipe L into the motor K. N is a waste-pipe, attached to the outlet of the aspirator. O is a valve controlling a waste-opening in the lower part of the main-valve chamber A. It is carried by a spring or yielding arm $p$ of a lever P, which is fulcrumed inside of the valve-case A at or near its bottom and extends upwardly therefrom. The lever P is connected at its upper end by a link or rod $p'$ with the pivot between the members of the toggle-lever $d\ d'$. When the main valves are closed and their operating connections are in the position shown in the drawings, the lever P bears against an abutment or stop $a$ in the valve-case and serves to arrest and hold the pivot of the toggle-lever in position for holding the valves tightly closed, as shown. In this position of the lever P the valve O is held open, and any water leaking into or formed by condensation in the valve-case is allowed to drain therefrom. Q is an electric circuit, which includes a battery $q$ or other source of electricity and a bell $q'$ or other alarm for indicating at any convenient point, either audibly or visibly, or both, when the main valves are open and water is admitted to the service-pipe C. One end of this circuit is connected with a fixed contact R and the other with a movable contact S, carried by one end of a lever T, the opposite end of which is connected with the valve O in such a way as to carry the contact S into engagement with the contact R when said valve is closed. U is a gate-valve in the supply-pipe B for shutting off the water from the main-valve case for the purpose of resetting or closing the main valve, and $u$ is a waste-cock for draining the water from the main-valve case and service-pipe C. The valve-case A is formed with a hand-hole and provided with a removable cover V, which affords access to the interior of the valve-case for closing or resetting the main valves. This form of the device operates as follows: The several parts being in the positions in which they are shown, the service or distributing pipes of the system being filled with air and the supply-pipe with water under the required pressures, if the air is released from the pipe C or its pressure is materially diminished the valve J will be opened by the spring $k$ and water under pressure will pass from the supply-pipe B through the pipe H and the aspirator, tending to create a vacuum and to exhaust the expansion-chamber E through the pipe I. The unbalanced pressure of the atmosphere upon the diaphragm F in the main-valve chamber will force it to the left, and thereby release and open the main valves D D, at the same time closing the waste-valve O. Water thereupon passes through the main-valve chamber into the service-pipe C and its connections. When it reaches the level of the upper end of the pipe L, it will pass through it into the motor K, filling its expansion-chamber and producing sufficient pressure upon the diaphragm or movable part to close the valve J, thus preventing further flow of water through the aspirator. When the main valves are opened and the waste-valve O is closed, the electric circuit Q will be closed and sound an alarm or display a signal, indicating at any convenient point that water is admitted to the distributing-pipes of the system, so that in case of an accidental operation of the valve the water can be shut off before it has time to do any considerable or serious damage. To drain the service and distributing system and reset the apparatus, the gate-valve U and the valve $h$ are closed and the waste-cocks $l$ and $u$ are opened, thus allowing the water to drain from the pipe C and its connections through the main-valve case A and from the pipe L and the expansion-chamber of the motor K. When this has been done, the cocks $l$ and $u$ are closed, the cover V is removed, and the toggle-lever $d$ and $d'$ is manually drawn back to the right until the lever P strikes the stop $a$. The adjusting sleeve or nut $d^2$ is then turned to force the valves D D tightly against their seats and the cover V is replaced. The service-pipe C and its connections are then charged with compressed air through the pipe M, and the pressure thus communicated through the pipe L to the diaphragm of the motor K closes the valve J and holds it closed. The gate-valve U and the valve $h$ are finally opened, and the apparatus is then in readiness for operation whenever the occasion therefor occurs. When the main valves D D are closed, the waste-valve O is opened and remains open, allowing any water which may leak into or collect in the main-valve chamber to drain therefrom as long as the main valves remain closed. The electric circuit Q is also opened or broken by the separation of the contacts R and S.

Referring to Fig. 2, which shows a modified construction and arrangement of the apparatus, the supply and service ports of the main-valve case A' are arranged at right angles to each other instead of in line, as shown in Fig. 1. A single main valve D', which normally closes the supply-port, is employed. The expansion-chamber E' is arranged directly opposite the supply-port, and the diaphragm F' is directly connected by its stem $f$ with the main valve. A valve J', which controls the flow of the actuating-fluid through the aspirator, is applied to the outlet instead of the inlet connection. The upper part of the expansion-chamber E' is provided with an air-vent cock $e$, and the lower part of the main-valve chamber A' is provided with a waste or drain cock $u'$. This form of the device operates as follows: Under normal conditions the valve J' will be held closed by the air-pressure in the motor K, and the expansion-chamber E' will be filled with water under pressure from the supply-pipe B through the pipe H, aspirator G, and pipe I. The pressure of the water in said chamber upon the diaphragm F' will hold the main valve D' closed against the water-pressure in said supply-pipe. When the air is released from the pipe C or its pressure is materially diminished, the valve J' will be opened, thus allowing water under pressure to flow through the aspirator G and escape therefrom through the chamber of said valve and the waste-pipe N. The water thus flowing in its normal direction through the aspirator tends to produce a vacuum in the pipe I and to exhaust the expansion-chamber E', and thereby permit the unbalanced pressure of the water in the supply-pipe B to open said valve. As the water rises in the service-pipe C above the level of the pipe L it will flow through the latter into the expansion-chamber of motor K and, acting upon its diaphragm, will close the valve J'. The further flow or waste of water through the aspirator is thus stopped. After the valve J' has been closed, as above stated, the main valve D' will remain open by reason of the balanced pressure on the opposite sides of the diaphragm F' until it is closed, as hereinafter explained. To drain the service-pipe and distributing system, close the valve D' and reset the apparatus. The gate-valve U and the valve h are closed and the cocks l and u' are opened, as explained in connection with Fig. 1, allowing the water contained in the main-valve chamber, the service-pipe C and its connections, the expansion-chamber of motor K, and the pipe L to drain therefrom. This being accomplished, the cocks l and u' are closed, and the service-pipe C is filled with compressed air. The compressed air entering the motor K closes the valve J'. The valve h and the vent-cock e are now opened and water allowed to flow from the supply-pipe B through the pipe H, aspirator G, and pipe I into the expansion-chamber E', any air contained in said chamber being allowed to escape through the cock e. As soon as the water issues therefrom the cock e is closed. The water being thus confined in said chamber creates a pressure therein and closes the main valve D', which will remain closed until it is again released in the manner hereinbefore explained. The gate-valve U is finally opened, and the apparatus is then in condition for operation whenever the occasion therefor arises.

Various changes in the minor details of construction and arrangement of parts may be made without affecting the essential principle or mode of operation of either form of the apparatus and without departing from the spirit and intended scope of my invention.

I claim—

1. In automatic valve apparatus the combination with a valve-case having supply and service connections, of valve mechanism controlling communication through said case between said connections, an expansion-chamber having a movable part connected with said valve mechanism, an aspirator connected with said chamber and with a source of fluid under pressure, and means for automatically permitting the fluid under pressure to pass through said aspirator and thereby exhaust said expansion-chamber when the pressure is reduced in the service or distributing pipe, substantially as and for the purposes set forth.

2. In automatic valve apparatus the combination with a valve-case having supply and service connections, of valve mechanism controlling communication between said connections, an expansion-chamber having a movable part connected with said valve mechanism, an aspirator connected with said chamber and with the supply connection of said valve, and means for automatically allowing fluid under pressure to pass from the supply-pipe through said aspirator whenever the air is released from or the pressure is reduced in the service-pipe, substantially as and for the purposes set forth.

3. In automatic valve apparatus the combination with a valve-case having supply and service connections, of valve mechanism controlling communication through said case between said connections, an expansion-chamber having a movable part connected with said valve mechanism, an aspirator connected with said chamber and with a source of fluid under pressure, a valve controlling the flow of the actuating-fluid through said aspirator, and a fluid-motor for operating said valve having a connection with the service-pipe, substantially as and for the purposes set forth.

4. In automatic valve apparatus the combination with a valve-case having supply and service connections, of valve mechanism controlling communication between said connections, an expansion-chamber having a movable part connected with said valve mechanism, an aspirator connected with the supply-pipe and with said chamber which it is arranged to exhaust, a valve controlling the flow of fluid through said aspirator and a fluid-motor for operating said valve connected with the service-pipe, substantially as and for the purposes set forth.

5. In automatic valve apparatus the combination with the valve-case having supply and service connections and ports, of valves adapted to close said ports and connected by a toggle-lever, and a motor acting through said toggle-lever to open said valves whenever the air is released from or the pressure is abnormally reduced in the service-pipe, substantially as and for the purposes set forth.

6. In automatic valve apparatus the combination with a valve-case having supply and service connections and ports, of valves adapted to close said ports and connected by a toggle-lever, an expansion-chamber having a movable part connected with said lever for opening said valves, an aspirator having a connection with a source of fluid-pressure, a valve controlling said connection and a fluid-motor for operating said valve having a connection with the service-pipe, substantially as and for the purposes set forth.

7. In automatic valve apparatus the combination with a valve-case having supply and service connections, of valve mechanism controlling communication between said connections, an expansion-chamber having a movable part connected with said valve mechanism, an aspirator connected with said chamber and with a source of fluid-pressure, a valve controlling the passage of the fluid-pressure medium through said aspirator, and a fluid-pressure motor for operating said valve communicating with the service connection of the main-valve mechanism, and adapted to open said valve when the pressure is reduced in said service connection and to close said valve when pressure is restored, substantially as and for the purposes set forth.

In witness whereof I hereto affix my signature in presence of two witnesses.

CHARLES L. FORTIER.

Witnesses:
CHAS. L. GOSS,
MAUDE L. EMERY.